(Model.)
J. P. FULGHAM.
FERTILIZER ATTACHMENT FOR SEEDING MACHINES.
No. 271,622. Patented Feb. 6, 1883.
3 Sheets—Sheet 1.
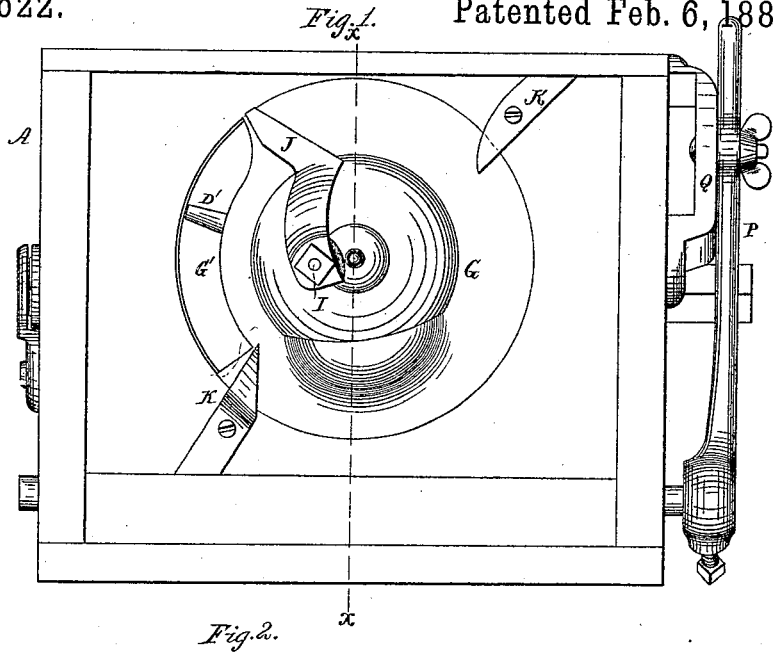
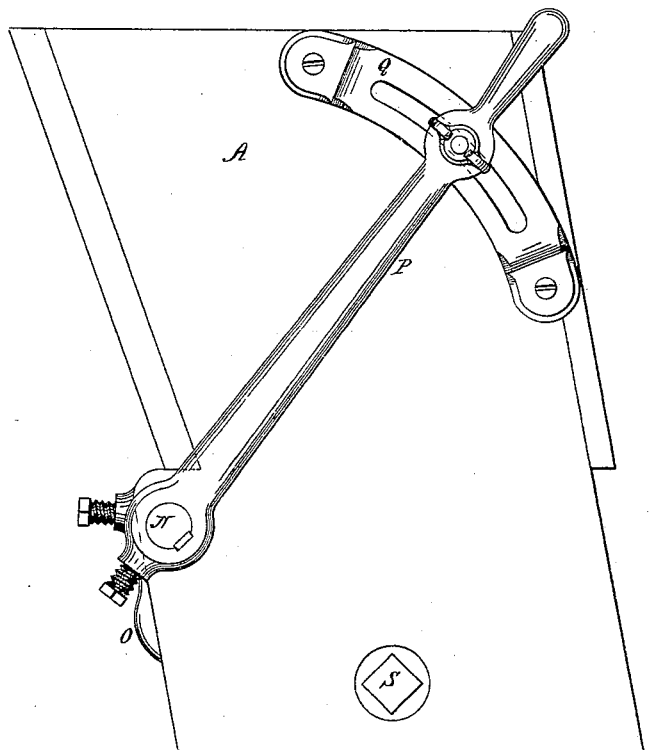
Witnesses:
W. C. Firdinston
D. P. Cowe
Inventor:
Jesse P. Fulgham
by
Melville Church,
his Attorney.

(Model.)  3 Sheets—Sheet 2.

J. P. FULGHAM.
FERTILIZER ATTACHMENT FOR SEEDING MACHINES.

No. 271,622.  Patented Feb. 6, 1883.

Witnesses:

Inventor:
Jesse P. Fulgham.
by
his Attorney.

(Model.) 3 Sheets—Sheet 3.
J. P. FULGHAM.
FERTILIZER ATTACHMENT FOR SEEDING MACHINES.

No. 271,622. Patented Feb. 6, 1883.

Witnesses:
W. C. Jordiuston.
D. P. Cowe

Inventor:
Jesse P. Fulgham
by
Melville Church,
his Attorney.

UNITED STATES PATENT OFFICE.

JESSE P. FULGHAM, OF RICHMOND, INDIANA, ASSIGNOR OF ONE-HALF TO THE WAYNE AGRICULTURAL COMPANY, OF SAME PLACE.

FERTILIZER ATTACHMENT FOR SEEDING-MACHINES.

SPECIFICATION forming part of Letters Patent No. 271,622, dated February 6, 1883.

Application filed September 14, 1882. (Model.)

*To all whom it may concern:*

Be it known that I, JESSE P. FULGHAM, of Richmond, in the county of Wayne and State of Indiana, have invented certain new and useful Improvements in Fertilizer Attachments for Seeding-Machines; and I do hereby declare the following to be a full, clear, and exact description of the same, reference being had to the accompanying drawings, forming part of this specification, in which—

Figure 3:
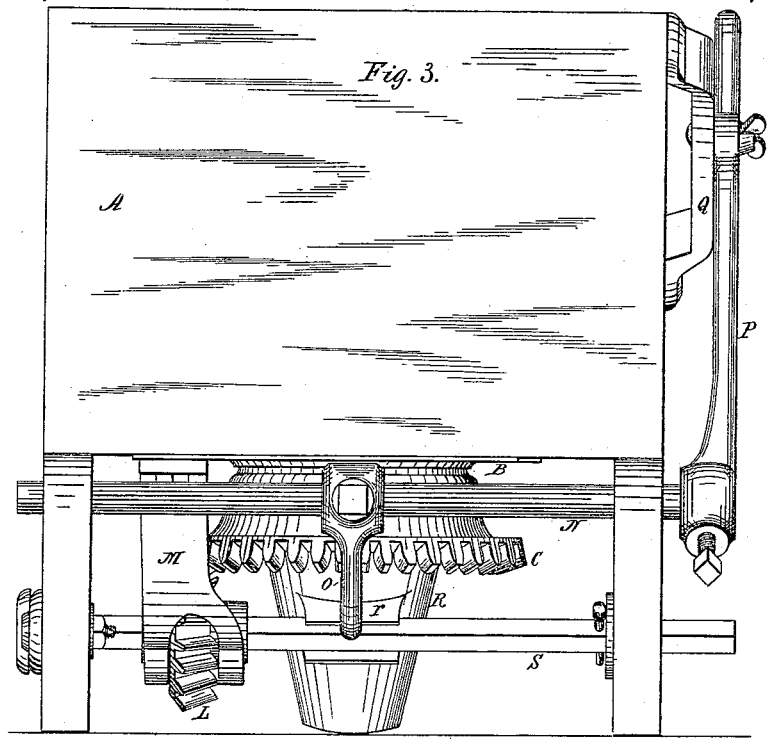
Figure 4:
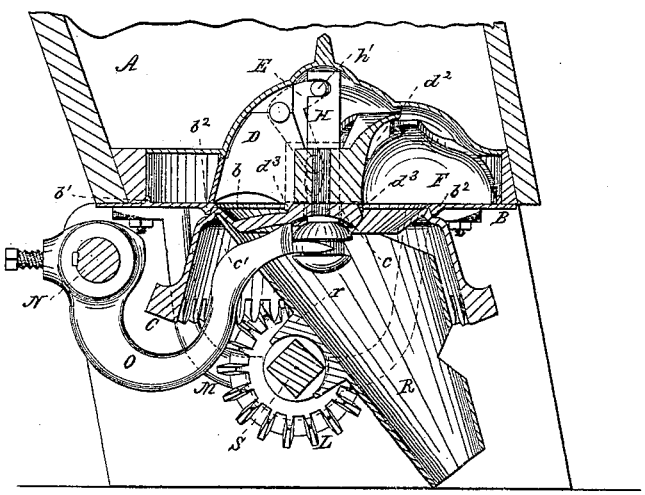
Figure 5:
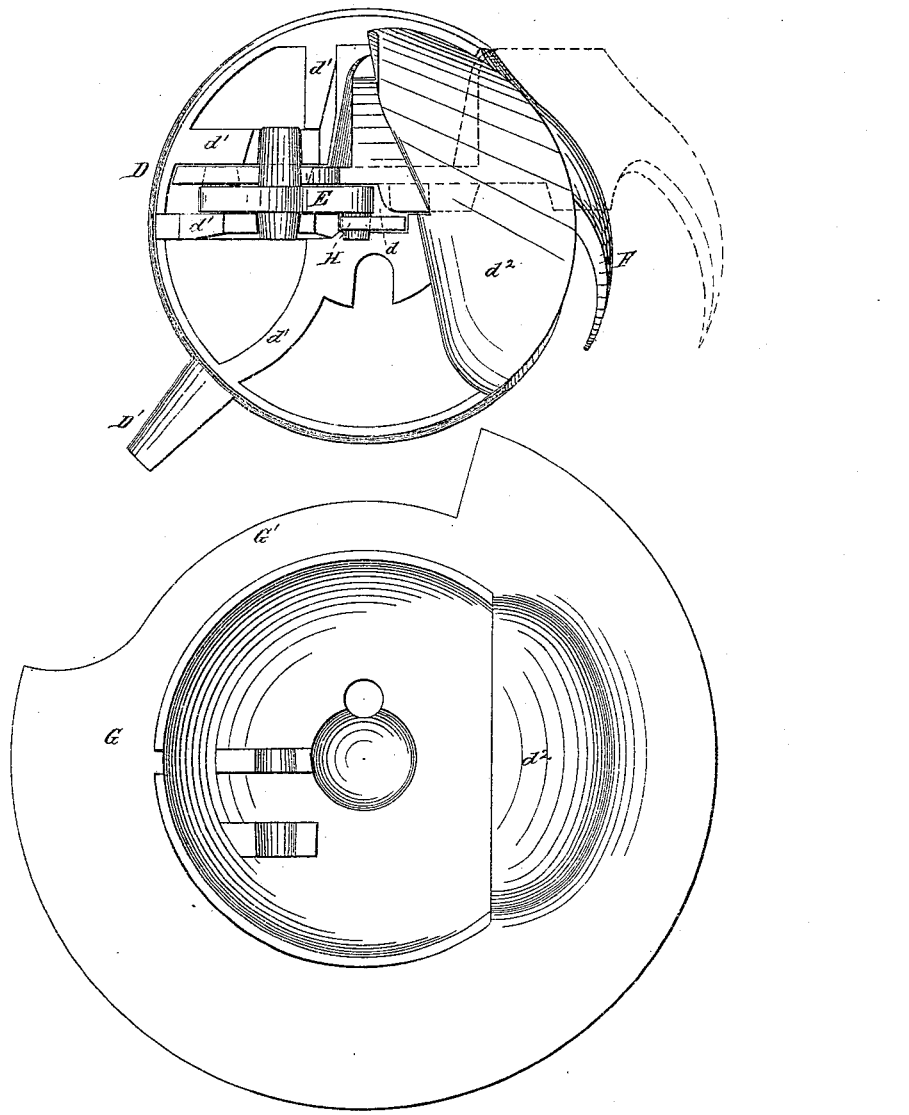

Figure 1 is a top plan view of my invention; Fig. 2, an end view; Fig. 3, a rear view of the same. Fig. 4 is a sectional view taken on the line $x\,x$, Fig. 1. Fig. 5 is a top plan view of the feeding device with the cap removed, the valve being shown retracted in full lines and projected in dotted lines.

Similar letters of reference in the several figures denote the same parts.

My present invention relates to that class of implements known as "fertilizer attachments to seeding-machines;" and it consists mainly in an adjustable force-feeding device of novel construction, by means of which the fertilizing material can be discharged in varying quantities in a given time without changing the speed at which the feeding mechanism is driven.

It further consists in certain minor improvements, all of which will be hereinafter fully described, and pointed out in the claims at the end of this specification.

Referring to the accompanying drawings, A represents a hopper of any suitable form and material, though preferably having its bottom of wood and of a thickness to correspond to the depth of the feed-cups, and provided with circular openings through it, whose sides form the outer walls of said feed-cups.

Beneath the bottom of the hopper is arranged a stationary bottom plate, B, the same having a circular orifice, $b$, near its center, and having also a flange, $b'$, on its upper side fitting closely in the orifice in said hopper-bottom, and serving to keep the plate in position, and another flange, $b^2$, on its under side for engaging the flange $c'$ of the driving-wheel C and keeping the latter in position.

Arranged above the plate B is a circular rotating part, D, which has a vertical central channel, $d$, arms $d'$, and chamber $d^2$, and is provided with lugs $d^3$ on its bottom, which engage with corresponding recesses in the hub of the driving-wheel C, so as to cause the two parts to rotate together.

Through the central channel, $d$, of the part D, and through a mortise, $c$, in the hub of the wheel C, passes a bar, H, which has on its lower end a grooved head, $h$, and in its upper end a slot, $h'$, with which engages one end of a bell-crank, E. This bell-crank is journaled in suitable bearings formed in the arms $d'$ of part D and in the under side of the upper portion or cap, G, of the feed-cup, as shown, and its lower arm is connected with a laterally-sliding valve, F, working in the chamber $d^2$ of the part D. The cap G covers the feed chamber and valve F, and is of circular form, with a portion cut away at G' in front of the valve, so as to allow the material to pass down into the feed-chamber.

Projecting from the part D under the cutaway portion of the cap is an arm or scraper, D', the function of which is to keep clear the bottom of the feed-chamber and prevent the adherence of material thereto.

A bolt, I, passes through the wheel C, central part of D, and cap G, and secures them all firmly together.

Secured to the cap G, with its outer end projecting immediately in front of the opening in the cap, is an agitator, J, the office of which is to loosen the material in the hopper, so that it will readily fall into the feed-chamber and keep the latter full; and for the purpose of cutting up any material which may be too large to pass through into the feed-chamber I employ stationary cutters K K, secured to the bottom of the hopper, as shown. These cutters by their action keep the inlet-orifice at all times open.

Depending from the under side of the plate B is a hanger or bracket, M, in which is journaled a driving-pinion, L, meshing into the gear-wheel C. This pinion has a square aperture through it for the accommodation of a correspondingly-formed driving-shaft, S, by which it is driven.

R is the conductor, which receives the fertilizing material from the orifice in the bottom of the feed-cup and deposits it in the upper ends of the tubes of the grain-feeding device or into the ground in the usual manner. Said conductor is provided with a concaved projection, r, by which it is hung loosely on the driving-shaft S, and when the latter revolves it shakes or jars the conductor and prevents the material from lodging therein.

N is an adjusting rod or shaft, journaled in suitable bearings on the hopper, and having secured to it an arm, O, whose end projects through a slot in the upper part of the conductor R and engages and rests within the groove in the head of the bar H. Also secured to said rod is a lever, P, whose upper end or handle works in a slotted segmental bracket, Q, on the end of the hopper, and is adapted to be held at any desired point of adjustment by means of a bolt and thumb-nut co operating with the slot in the bracket, as shown, or otherwise.

Now, when the feed-cup is revolved by the rotation of the driving-shaft and intermediate gearing, the material in the hopper passes down through the opening in the cap into the feed-chamber, filling the latter in front of the valve, and the latter, being of involute form, draws the material regularly and positively into the circular orifice in the bottom plate, from whence it falls through the conductor to the ground. When the lever P is moved so as to elevate the end of the arm O, the bar H is pushed up, thereby tilting the bell-crank and causing it to push the valve into the feed-chamber; but when the lever is moved in the opposite direction all the movements of the parts mentioned are reversed and the valve is withdrawn or retracted from the feed-chamber.

Inasmuch as the distance which the valve projects into the feed-chamber determines the amount of material it can take out of the chamber at one revolution of the feed-cup, it is obvious that by projecting the valve more or less into the chamber the discharge of material can be accurately gaged and regulated.

I have referred in the above description to but one feed-cup, conductor, &c.; but it will of course be understood that a number of feed-cups driven from a common shaft are designed to be employed in the same hopper in connection with their respective conductors, as is usual in machines of this class.

Having thus described my invention, I claim as new—

1. The combination, with the hopper-bottom having the circular aperture, as described, of the metal plate formed with the upper and lower flanges, and the driving-gear wheel held in position by the lower flange of the plate, substantially as described.

2. The combination of the plate B, the wheel below the plate, and the central part of the feed-cup above the plate, all arranged substantially as described.

3. The combination of the plate B, the wheel below the plate, the central part of the feed-cup, and the cap with the means for securing the plate, wheel, and cap together, substantially as described.

4. The combination, with the hopper-bottom having the aperture, as described, of the metal plate below the hopper-bottom, the central part of the feed-cup, the cap, and the laterally-moving valve, all arranged and adapted for operation substantially as described.

5. The combination, with the central part of the feed-cup, of the laterally-moving valve, the bell-crank, and means for oscillating the bell-crank to project or retract the valve, substantially as described.

6. The combination, with the central part of the feed-cup, of the laterally-moving valve, the bell-crank, the vertically-moving rod connected to the bell-crank, and means for holding said rod at any desired elevation, whereby to determine the extent of projection of the valve into the feed-chamber, substantially as described.

7. The combination of the hopper-bottom having the circular orifice, the metal plate B, the central portion of the feed-cup, and the cap having the cut-away portion, said parts forming the chamber in which the valve works, substantially as described.

8. The combination, with the feed-chamber, formed in part by a central horizontally-rotated portion, D, of a laterally-adjustable involuted valve adapted to be projected more or less into the feed-chamber, substantially as described.

9. The combination, with a feed-chamber, of a horizontally-rotating feed-cup having a central discharge, and provided with a laterally-adjustable valve capable of being projected into the feed-chamber, so as to withdraw more or less material therefrom at each revolution, substantially as described.

10. The combination, with the feed-cups, of the conductors, with means for imparting to them a jarring motion, substantially as described, for the purpose specified.

11. The combination, with the angular driving-shaft, of the conductors hung thereon and receiving a jarring motion therefrom, substantially as described.

JESSE P. FULGHAM.

Witnesses:
CHAS. A. FRANCISCO,
L. N. PAGE.